United States Patent [19]

Cayton et al.

[11] 3,749,035
[45] July 31, 1973

[54] PRECISION DEPTH SEED PLANTER

[75] Inventors: David Walter Cayton, Cupertino, Calif.; Leslie William Johnson, Moline, Ill.

[73] Assignee: Deere & Company, Moline, Ill.

[22] Filed: Dec. 28, 1970

[21] Appl. No.: 101,916

[52] U.S. Cl.................... 111/85, 172/4, 172/413, 172/484, 111/62
[51] Int. Cl............................................. A01c 5/00
[58] Field of Search ... 111/85–87, 62, 6; 172/4, 413, 484, 462, 487, 239, 7, 9

[56] References Cited
UNITED STATES PATENTS

| | | | |
|---|---|---|---|
| 3,611,956 | 10/1971 | Moore et al. | 111/62 |
| 2,755,721 | 7/1956 | Rusconi | 172/4 |
| 3,208,536 | 9/1965 | Orendorff | 172/413 X |
| 2,975,844 | 3/1961 | Oehler et al. | 172/484 |
| 2,318,205 | 5/1943 | Drennan | 111/62 |
| 3,200,778 | 8/1965 | Whelchel | 111/85 |
| 2,627,797 | 2/1953 | Acton | 172/4 |

Primary Examiner—Robert E. Pulfrey
Assistant Examiner—Stephen C. Pellegrino
Attorney—H. Vincent Harsha, Harold M. Knoth, William A. Murray and John M. Nolan

[57] ABSTRACT

A precision depth planter including a plurality of furrow-forming units mounted on a main frame for relative vertical movement, each unit including a pair of depth gauge wheels for carrying the unit and for regulating the depth of the furrow formed thereby. A seed dispensing unit is mounted on the frame directly above each furrow-forming unit and includes a seed container and selecting mechanism for delivering seeds to the furrow, the several selecting mechanisms being commonly driven from a drive shaft extending transversely between the dispensing units. A separate hydraulic cylinder acts on each furrow-forming unit to maintain a constant force on said unit regardless of the position thereof relative to the main frame. A ground-engaging sensing unit mounted on the planter frame measures soil hardness and in conjunction with a hydraulic control valve acts to vary the force exerted by the hydraulic cylinders to maintain a uniform planting depth irrespective of variations in soil hardness.

17 Claims, 7 Drawing Figures

INVENTORS
DAVID W. CAYTON
LESLIE W. JOHNSON

PRECISION DEPTH SEED PLANTER

BACKGROUND OF THE INVENTION

The present invention relates generally to seed planters, and more particularly to a planter having means for precisely maintaining a constant planting depth irrespective of variations in soil hardness.

A conventional seed planter of the type illustrated, for example, in U.S. Pat. No. 2,975,844 to Oehler et al., issued 21 Mar. 1961, comprises a transversely elongated frame supporting a plurality of spaced, rearwardly extending, individual planting units for independent vertical movement relative to the frame. Each unit includes a furrow opener, a press wheel mounted behind the furrow opener which serves also as a depth gauge wheel, and a seed container and dispensing mechanism mounted above the opener for intermittently depositing seeds in the furrow formed thereby. If it is desired to apply pesticides to the soil simultaneously with the seed planting operation, a pair of hoppers therefor are normally mounted on the unit above the combination press and depth gauge wheel. A spring pressure mechanism is commonly provided between the frame and each unit for exerting a downward force on the latter, the force exerted by the spring mechanism being in addition to that provided by the weight of the unit and the quantity of seed and pesticide contained thereon.

Certain features of this conventional design contribute to a lack of uniformity in planting depth. For example, since the press wheel, from which the planting depth is gauged, is necessarily mounted at some distance behind the furrow opener, fore-and-aft variations in ground level along the planting row result in corresponding variations in planting depth along the row. In addition to this inherent gauging error, a substantial variation in planting depth results from variations in the down force acting on the unit, since for a constant soil hardness, such down force variations cause corresponding variations in the depth of penetration of the unit gauge wheels, which, in turn, results in variations in planting depth. The down pressure acting on the units is basically a function of two variables: first, the quantity and thus weight of the seed and pesticide contained in the respective hoppers, this quantity continually depleting during the planting operation between refillings of the hoppers, and second, the height of the unit relative to the frame and thereby the force exerted by the spring in the down force mechanism, this force being inversely proportional to the spring length. Thus, as the unit moves vertically relative to the frame to follow the surface of the ground, the planting depth of the unit varies inversely with its vertical position. In addition to its effect on planting depth, such variations in down pressure on the unit, because transmitted through the press wheel thereof, result also in variations in the compaction of soil surrounding the planted seed.

A still further source of planting depth error is that caused by variations in soil hardness, such variations commonly existing between different fields, between different areas within the same field, and between the same areas in a field over a period of time. For a constant down force on the planting unit, the gauge wheels thereof will naturally penetrate further in soft than in hard soil, resulting in a deeper planting depth in soft as opposed to hard soil.

Planting depth, and more broadly the entire seed environment, is becoming an increasingly important concern of the farmer as every effort is made to increase crop yield. Fast and uniform seed germination, an important factor in increasing crop yield, requires a uniform, optimum planting depth.

SUMMARY OF THE INVENTION

It is, accordingly, an object of the present invention to provide a seed planter capable of precisely maintaining a uniform planting depth. More specifically, it is an object of the invention to provide a planter having a main frame supporting a plurality of trailing planting units, wherein variations in down pressure on the individual units resulting from variations in vertical height of the unit relative to the main frame, and from variations in the quantity of seed and pesticide contained thereon, are eliminated. It is a further object to provide a planter having press wheel means capable of uniformly compacting the soil in the planting rows, irrespective of the down force acting on the planting unit. It is yet a further object to provide a planter having a main frame and a plurality of individual planting units, the planter including means for exerting a uniform down force on each individual planting unit irrespective of the vertical position thereof relative to the main frame, further to provide means for selectively varying the down force so exerted on the units, and still further to provide means for simultaneously and uniformly varying the down force acting on the several units. It is a further object to provide such a planter having means for automatically varying the down force on the several planting units in response to soil hardness.

These and other objects are achieved, according to the invention, by the provision of a planter having a transversely extending main frame, a plurality of relatively light-weight furrow-forming units mounted on the frame for independent vertical movement, and an equal number of associated seed dispensing units, each of the latter units being independently mounted on the main frame and extending above its associated furrow-forming unit in vertical spaced relation. Each furrow-forming unit includes a furrow opener means, a pair of adjustable depth gauge wheels mounted on opposing sides of the opener means for regulating the running depth thereof, and a separate press wheel means in following relation to the furrow opener and carried by a separate subframe structure mounted for independent vertical movment relative to the opener. Each overlying dispensing unit comprises a seed hopper and associated seed selecting mechanism, the latter communicating with the furrow formed by the furrow opener through a vertically extending seed conveying conduit, and a pair of pesticide hoppers and associated dispensing means mounted rearwardly of the seed hopper and also including a pair of vertically extending conduits for delivering the pesticide to the plant row. The seed selecting mechanism contained in the several dispensing units is driven from a powered shaft extending transversely between the units, as are the several pesticide dispensing means associated therewith.

A positive down pressure is exerted on each of the relatively light furrow-forming units by means of a hydraulic actuator or cylinder acting between the unit and the planter main frame. The tractor hydraulic system supplies constant pressure fluid to the cylinder whereby the force exerted by the latter is essentially independent of its length. Consequently, the down force acting on the unit remains essentially uniform irrespective of its vertical position relative to the frame. The operation of this system is contrasted with that of the conventional spring pressure mechanism, wherein the down force varies with vertical position of the unit.

The hydraulic actuators on the several units are connected with each other and with the tractor hydraulic system in a parallel arrangement, the latter system including a pressure control valve whereby the force exerted on the units by the actuators can be varied uniformly and simultaneously. This is to be contrasted with the conventional spring pressure down force mechanism in which adjustments must be separately made to each unit, a time-consuming operation. The pressure control valve can be actuated either manually or automatically in response to soil hardness. Although the adjustable depth gauge wheels on the furrow-forming units are effective to approximately regulate the running depth of the associated furrow opener means, variations in soil hardness create corresponding variations in furrow depth for a constant down force; the softer the soil, the deeper the gauge wheels penetrate the surface of the ground, and thus the deeper the planting depth, and conversely, the harder the ground, the shallower the gauge wheel penetration and planting depth. To maintain a constant, optimum planting depth throughout a field having relatively hard and soft areas, a lesser down force must therefore be employed in the soft areas than in the hard areas.

The automatic soil hardness sensing unit of the invention comprises a relatively wide shoe mounted on the planter frame and adapted to ride on and follow the surface of the ground, a relatively narrow, weighted shoe mounted on the wide shoe and adapted to penetrate the surface of the ground at various depths corresponding to variations in ground hardness, and means for comparing the relative vertical positions of the two shoes and actuating the hydraulic pressure control valve on the tractor in direct response to variations in their positions. For example, in relatively soft ground, the weighted, narrow shoe will ride at a deeper level with respect to the wide shoe than would be the case in harder ground, and such deeper penetration is translated into a lesser down force on the planting units, thereby maintaining a uniform furrow depth throughout both hard and soft areas.

BRIEF DESCRIPTION OF THE DRAWINGS

The preferred embodiment of the invention will be described in conjunction with the accompanying drawings in which.

DESCRIPTION OF THE PREFERRED EMBODIMENT

In the ensuing description, right- and left-hand reference is determined by standing at the rear of the planter and facing the direction of travel.

Figure 1:
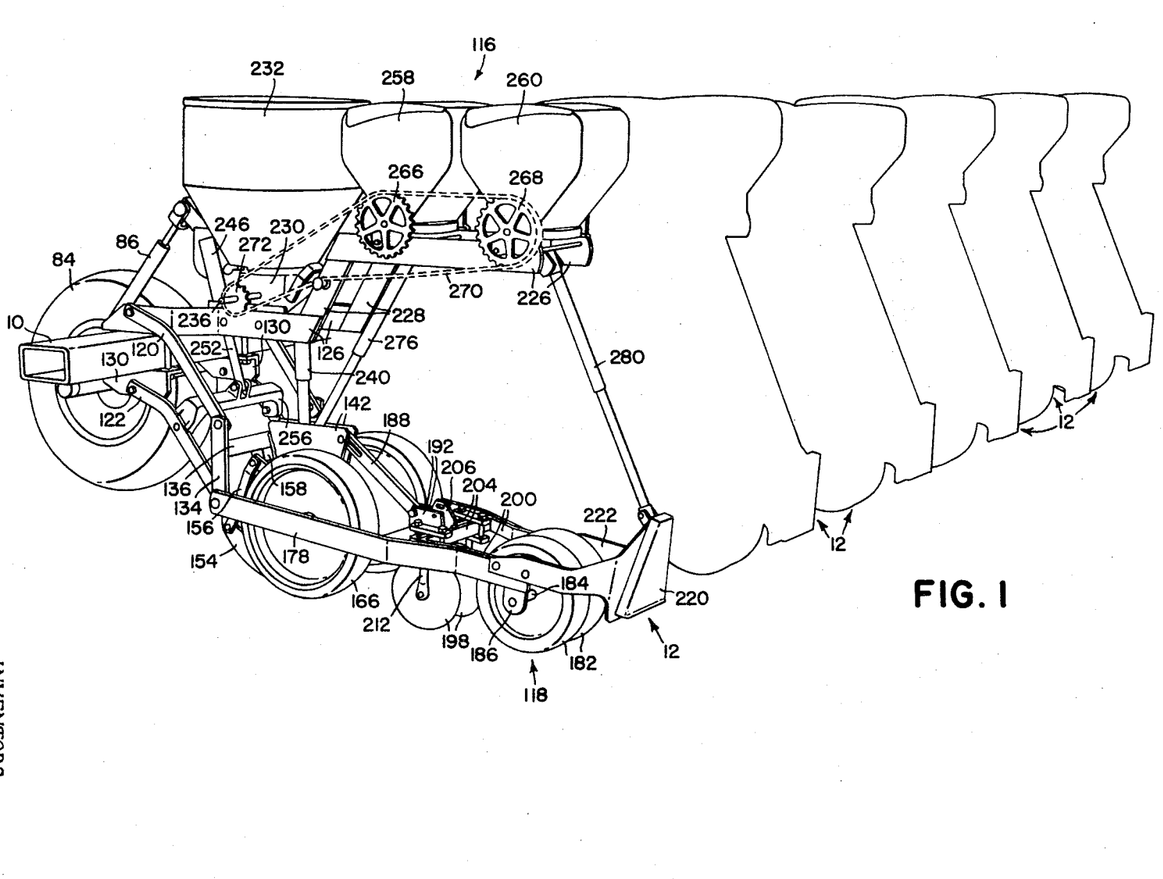
FIG. 1 is a perspective view of the planter taken from the left rear, with all but one of the planting units shown in outline form for the sake of clarity.
Figure 2:
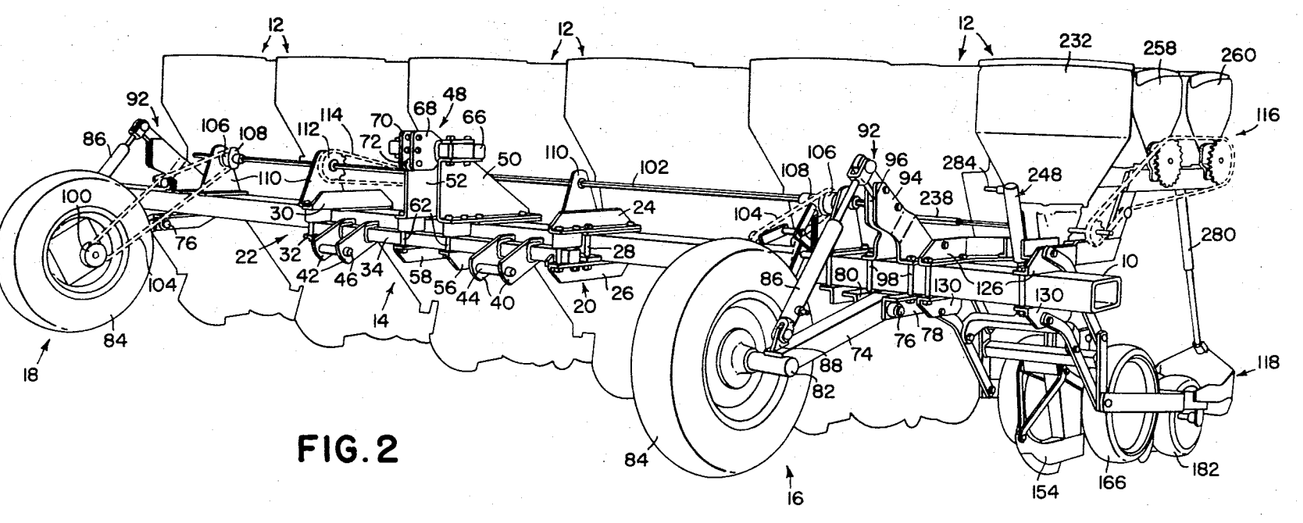
FIG. 2 is a perspective view from the left front, again with all but one of the planting units in outline form.

Referring first to FIGS. 1 and 2 of the drawings, the planter comprises, generally, a transversely elongated, rectangular cross-sectional main frame 10 having a plurality of individual planting units 12 mounted in trailing relation thereon. In the embodiment illustrated, the frame is provided with a three-point or integral hitch structure 14 on its center portion for attachment to a tractor, and a pair of vertically adjustable, ground-engaging wheel assemblies 16 and 18 on opposite sides thereof to gauge the operating height of the main frame 10. As will be apparent to those skilled in the art, the principles of the present invention could as well be incorporated in a planter of the pull or trail type, wherein the frame structure is provided with a fore-and-aft draft member adapted for connection to the drawbar of a tractor.

The three-point hitch structure 14 of the illustrated embodiment includes a pair of left and right brackets 20 and 22 secured to the frame 10 at equal distances to the left and right, respectively, of the longitudinal centerline thereof, the left bracket 20 consisting of upper and lower members 24 and 26 held to the respective surfaces of the member 10 by means of elongated bolts 28, and the right bracket 22 consisting of upper and lower members 30 and 32 similarly held to the member 10. The opposite ends of a transverse bar 34 are rigidly clamped between the upper and lower, forwardly extending portions of the brackets 20 and 22. Left and right pairs of forwardly extending members 40 and 42 are rigidly fixed, as by welding, to the respective ends of the bar 34 inwardly of the brackets 20 and 22, and support a pair of left and right transversely aligned hitch pins 44 and 46 between their forward ends for receiving the two outer or lower arms of the tractor integral hitch mechanism. The hitch device 14 further includes a center bracket 48 comprising a left and right pair of upstanding, triangular members 50 and 52 rigidly secured to the upper surface of the frame member 10, and a lower pair of left and right members 56 and 58 secured to the lower surface of the frame 10 directly below the respective triangular members 50 and 52. The middle portion of the bar 34 is held between the forward ends of the lower members 56 and 58 and upper members 50 and 52 by means of bolts 62. A short transverse bar 66 is clamped to the upper ends of the triangular members 50 and 52 and has a transversely spaced pair of forwardly extending plates 68 and 70 fixed to its midportion. A hitch ball 72 is mounted between the lower forward portion of the plates 68 and 70 to receive the center arm of the tractor integral hitch and thereby complete the tractor-planter connection.

The gauge wheel assemblies 16 and 18 of the planter are essentially mirror images of each other and comprise, generally, a forwardly extending arm 74 pivotally mounted at 76 between a pair of left and right angle members 78 and 80, and having a stub axle 82 fixed to its forward end and rotatably receiving a groundengaging wheel 84 thereon. An extensible and retractable jack 86 acts between a bracket 88 on the forward end of the arm 74 and the upper portion of a bracket 92 secured to the frame 10. The bracket 92 consists of left and right member 94 and 96, respectively, which are secured to the upper surface of the frame 10 with bolts 98, which bolts also hold the angle members 78 and 80 to the underside of the member 10. It will be apparent that extension and retraction of the jack 86 is effective to pivot the arm 74 about the pin 76 and thereby raise and lower the wheel 84 relative to the planter frame. In operation, the wheel assemblies 16 and 18 act as height gauge means for the planter main frame in the operating position, and supply operating power to the seed and pesticide dispensing mechanisms carried by the planting units.

The latter function of the wheel assemblies 16 and 18 is accomplished in conjunction with the drive mechanism illustrated in FIG. 2. The mechanism is of more or less conventional design and comprises, generally, a sprocket 100 mounted on each of the wheels 84 for rotation therewith, a transverse jackshaft 102 rotatably supported above the main frame 10, and a pair of drive chains 104 drivingly connecting the sprockets 100 with a pair of aligned sprockets 106 on opposite ends of the shaft 102. To compensate for the different speeds of rotation of the wheels 84 as the planter is turned to the right or left, each of the sprockets 106 is coupled to the shaft 102 through a one-way clutch or ratchet device 108. The jackshaft 102 is supported on the frame 10 by a plurality of transversely spaced upstanding brackets 110. Power is transmitted from the jackshaft 102 rearwardly to a transverse drive shaft extending between the several planting units 12 through a sprocket 112 on the right side of the jackshaft 102, an aligned sprocket (not shown) on the planting unit drive shaft, and a drive chain 114 trained around the drive and driven sprockets.

Although the planter illustrated is provided with six planting units 12, it will be apparent from the ensuing description that this number may be readily increased or decreased, since the units are constructed for easy addition to or removal from the main frame 10. Each of the planting units 12 consists of a seed dispensing unit 116 mounted rigidly on the main frame 10 and extending rearwardly therefrom, and a furrow-forming unit 118 mounted for relative vertical movement on the main frame and extending rearwardly in underlying relation to the associated seed dispensing unit.

Figure 3:
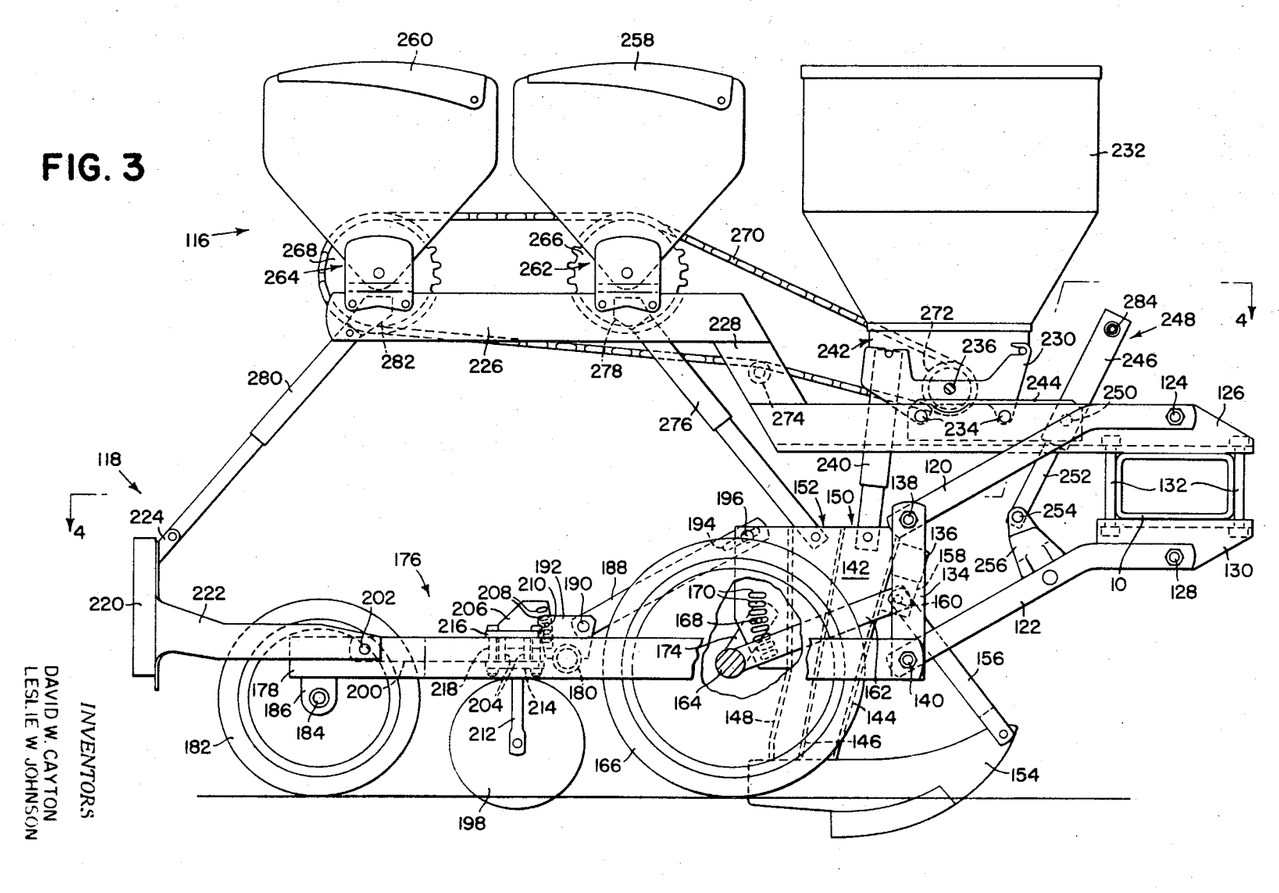
FIG. 3 is a side elevation view of one of the planting units.
Figure 4:
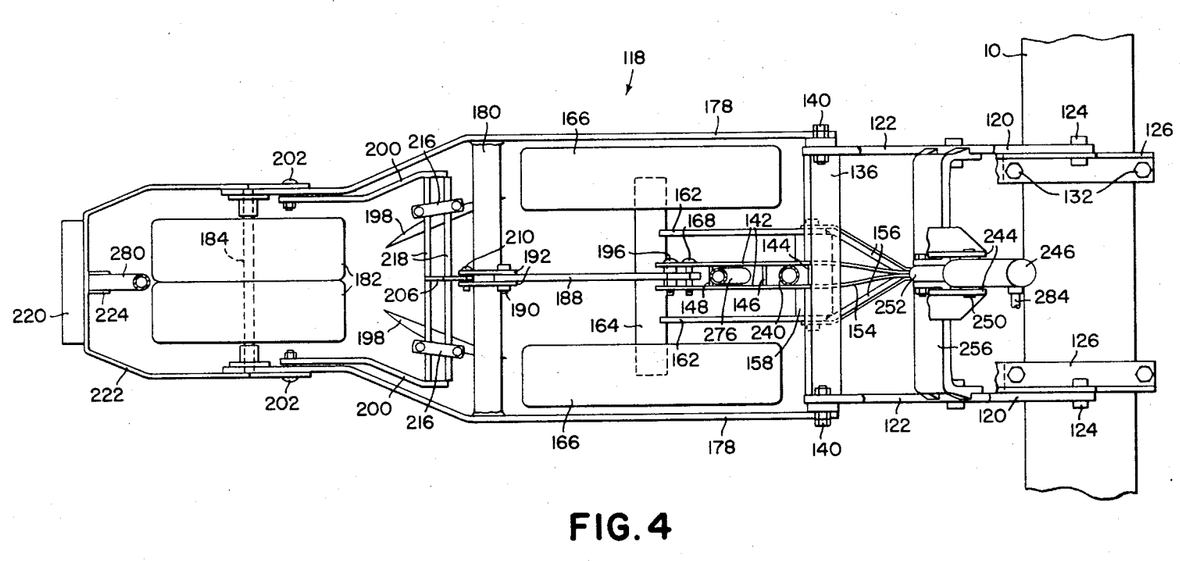
FIG. 4 is a view taken generally along the line 4—4 of FIG. 3.

Upper and lower pairs of parallel links or levers 120 and 122 mount the furrow-forming units on the main frame for vertical parallel movement, thereby enabling the unit to follow the surface of the ground while remaining parallel thereto. The forward ends of the upper links 120 are pivoted at 124 on a pair of upper brackets 126 which, in turn, are rigidly secured to the main frame 10 and which, as will subsequently appear, form the main supporting structure for the seed dispensing unit 116. The forward ends of the lower links 122 are likewise pivoted at 128 to a pair of lower brackets 130, the latter lying directly beneath the upper brackets 126 and being secured thereto and to the main frame 10 with fore-and-aft elongated bolts 132. An H-shaped supporting structure, comprising a pair of vertical legs or members 134 rigidly interconnected by a transverse cross member 136, is pivotally carried at 138 and 140 by the upper and lower links, respectively, and in turn carries the furrow-forming means and press wheel subframe of the unit. Centered on the back side of the cross member 136 are a pair of transversely spaced vertical plate members 142 which, in conjunction with transverse connecting walls 144, 146, and 148, define a pair of fore-and-aft, downwardly converging passages 150 and 152. As will subsequently be described in greater detail, seed and pesticide from the respective selecting mechanisms on the overlying seed dispensing unit are introduced into the top of the passages 150 and 152, respectively, drop downwardly therethrough, and are deposited in the furrow formed by the furrow-forming means. The latter means, in the embodiment illustrated, comprises conventional furrow-opener runner blades 154 fixed to the lower edge of the plate members 142, though it will be readily apparent to those skilled in the art that various other conventional devices, such as a pair of rearwardly diverging disk blades, could be substituted for the runner blades 154. A pair of offset straps 156 extend between the transverse ends of a bracket member 158, fixed centrally to the underside of the cross member 136, and the forward end of the runner 154 to support the latter relative to the H-shaped structure. Pivotally mounted on the same bracket 158 at 160 and extending downwardly and rearwardly therefrom are a pair of gauge wheel support arms 162. A transverse axle 164 is fixed to the ends of the arms 162 and rotatably supports a pair of gauge wheels 166 on its opposite ends, the vertical position of the wheels being adjustable relative to that of the runner 154 to regulate the approximate running depth of the latter. The wheels 166 are maintained in various positions of adjustment by means of a pin 168 selectively positionable in any of a plurality of elongated slots 170 in the lower rear portions of the plate members 142. The portion of the pin intermediate the plates 142 is received by a short bracket 174 fixed to the midpoint on the axle 164 and extending forwardly between the plates 142.

The furrow-forming unit 118 further includes a press wheel subframe structure, indicated generally by the numeral 176. The structure 176 comprises a pair of fore-and-aft side members 178 pivoted at their forward ends to the legs 134 of the H-shaped supporting structure, the members 178 extending alongside and outwardly of the gauge wheels 166 and being joined rearwardly thereof by a transverse tubular member 180. The rearward ends of the members 178 converge inwardly and receive a pair of press wheels 182 therebetween on a transverse axle 184 which, in turn, is rotatably supported at its ends in aligned bearing members 186 fixed to and projecting downwardly from the members 178. The vertical pivotal movement of the subframe 176 relative to the H-shaped supporting structure is limited by means of a lost motion connecting link 188. The rear end of the link 188 is pivotally mounted on a pin 190 between a pair of spaced plates 192 fixed to the transverse tube 180, while the forward end thereof extends between the plates 142 and is provided with an elongated aperture 194 for receiving a pin 196 extending transversely between the plates 142. When disposed in its normal operating position, illustrated in FIGS. 1 and 3, the pin 196 is centered in the aperture 194, thereby permitting approxiamtely equal pivotal movement of the subframe both above and below its normal position.

A pair of conventional covering disks 198 are carried by the press wheel subframe 176 between the depth gauge wheels 166 and the press wheels 182. The disks are angled inwardly, the angle being adjustable as will presently appear, to direct soil into the furrow and cover the seed therein. A separate subframe mounts the disks 198 on the press wheel subframe for adjustment of their vertical position, the subframe comprising a pair of fore-and-aft members 200 pivoted at 202 to the side members of the subframe 176, and rigidly connected at their forward ends with a pair of longitudinally spaced cross members 204. An upstanding bracket 206 is fixed to the upper edges of the members 204 and extends forwardly between the plates 192. The bracket 206 is provided with a plurality of apertures 208 for receiving a pin 210, the latter extending between the plates 192 and being releasably retained therein. Each disk is rotatably mounted on the lower end of a vertical standard 212 which, in turn, is fixed to the bottom side of a lower mounting bracket 214. The lower bracket 214 and an identically-shaped upper bracket 216 are clamped to the cross members 204 with bolts 218, the structure described permitting ready adjustment of both the lateral position and angle of the disks 198.

A conventional diverging pesticide distributor 220 is mounted behind the press wheels 182 on a U-shaped supporting structure 222, the legs of the U being secured to the rearward ends of the side members 178 of the press wheel subframe 176. As will be described subsequently in more detail, pesticide is supplied to an inlet opening 224 on the upper portion of the dispenser from a hopper on the seed dispensing unit.

As previously mentioned, the brackets 126 supporting the forward ends of the furrow-forming unit upper parallel links 120 also comprise the main supporting structure for the associated seed dispensing unit 116. The remainder of the supporting structure includes a pair of fore-and-aft pesticide hopper supports 226, and a pair of inclined members 228 rigidly connecting the rearward ends of the brackets 126 with the forward ends of the supports 226. A seed selecting mechanism 230 of conventional design and an associated hopper 232 are mounted between the brackets 126 on a pair of fore-and-aft, transversely extending bolts 234. The selecting mechanism 230, which may, for example, be of the conventional seed plate type, is driven from a transverse shaft 236 extending therethrough. A telescoping transverse shaft 238 (see FIG. 2) drivingly interconnects the shafts 236 on each adjacent pair of planting units 12, the resulting series of shafts 236 and 238 conjunctively defining a single transverse shaft extending between the extreme left and right planting units 12 and comprising the common drive for all of the units. The planting unit drive shaft, as already described, is driven from the jackshaft 102 through the chain 114. A telescoping seed conveying conduit 240 extends vertically between the discharge area 242 of the selecting mechanism 230 and the upper opening of the seed passage 150 on the furrow-forming unit 118. The seed from the hopper 232 thus drops through the tube 240 to the passage 150, thence through the passage to the bottom of the furrow formed by the runner 154.

A pair of transversely spaced angle members 244 are interposed between each side of the mechanism 230 and the adjacent brackets 126 and are rigidly held therein with bolts 234. The cylinder portion 246 of a single-acting hydraulic actuator 248 is pivotally mounted between the forward ends of the members 244 on trunnions 250, and the rod portion 252 thereof is pivotally connected at 254 with a transverse support 256 extending between the lower parallel links 122. The functions served by the actuator 248 will be detailed below.

Mounted directly behind the seed hopper 232 is a matched pair of pesticide hoppers 258 and 260, the forward hopper 258 being for insecticide and the rear hopper 260 for herbicide. Each hopper 258 and 260 includes a conventional rotary distributing mechanism 262 and 264, respectively, in its lower portion, the mechanisms being driven by sprockets 266 and 268, respectively. The sprockets 266 and 268 are in turn driven by a chain 270 from a sprocket 272 on the left end of the seed selecting mechanism drive shaft 236. An adjustable idler wheel 274 maintains proper running tension in the chain 270. A telescoping pesticide conveying tube 276 extends between the outlet opening 278 of the distributing mechanism 262 in the forward hopper 258 and the upper opening of the rear passage 152 defined by the vertical members 142 and transverse connecting walls 146 and 148. The pesticide from the hopper 258 thus passes through the tube 276 to the passage 152, thence through the passage 152 to the furrow formed by the runner 154. The upper and lowr ends of the tube 276 are pivotal about their respective mountings to accommodate the change in angular relationship between the tube and its supports as the furrow-forming unit 118 moves vertically relative to the overlying seed dispensing unit 116. In a similar manner, a telescoping tube 280 connects the outlet 282 on the rear pesticide hopper 260 with the inlet 224 on the diverging dispenser 220. Pesticide from the rear hopper thus passes downwardly through the tube 280, thence through the dispenser 220 which distributes it in an even band over the surface of the plant row.

It will be apparent from the structure described thus far that the furrow-forming unit 118 of the planter is relatively light in weight, this fact stemming primarily from the removal of the seed and pesticide selecting mechanisms and hoppers to the independently mounted seed dispensing unit 116. It will also be apparent that the weight or down force on the unit 118 resulting from the weight thereof will remain constant through the planting operation, irrespective of the quantity of material contained within the pesticide and seed hoppers. Although such a constant down force would be desirable if operating in soil of a constant hardness, since soil hardness quite often varies substantially within a single field and from one field to another, it is desirable to instead provide means exerting a down force on the unit which varies inversely with soil hardness. The desirability of such a varaible down force arises from the fact that the force acting on the depth gauge wheels of the furrow-forming unit determines the depth below ground surface at which they will ride, and this depth, in turn, directly determines the depth of the furrow formed by the furrow-forming means, and thus the depth at which the seed is planted.

Figure 5:
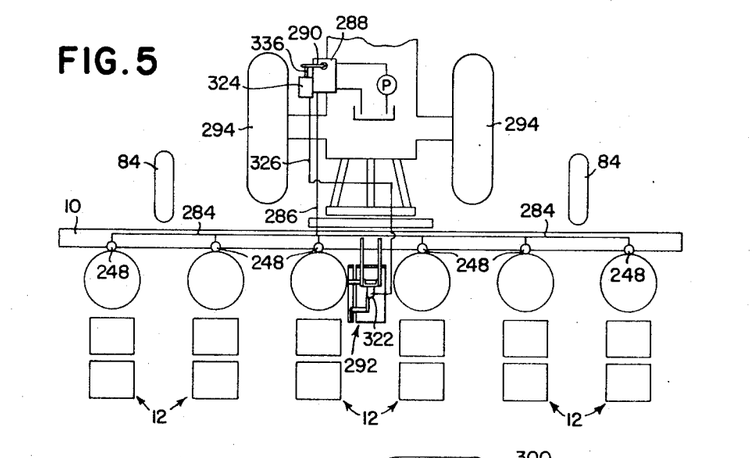
FIG. 5 is a schematic representation of the hydraulic system of the invention.

According to the present invention, means for providing such a variable down force on the furrow-forming unit is provided in the form of the hydraulic actuator 248 acting between the planter frame and the unit. Referring to FIG. 5 of the drawings, the several hydraulic actuators 248 on the planter are connected in a parallel arrangement with each other, through hydraulic lines or hoses 284, and with a conventional source of hydraulic fluid on the tractor through line 286. The fluid source on the tractor includes a pressure control valve 288 which is actuatable by means of control lever 290 to vary the pressure of the fluid within the actuators 248 and thus the force exerted thereby on the furrow-forming unit.

Although it is contemplated that the valve 288 could be manually controlled by the tractor operator, whereby the operator would visually sense variations in soil hardness and actuate the valve accordingly without interrupting the planting operation, according to the present invention means in the form of a soil hardness sensing unit 292 is provided to continually sense and automatically regulate the pressure control valve 288 in response to soil hardness. As shown schematically in FIG. 5, the sensing unit or ground feeler device 292 is mounted centrally on the main frame member 10, between the two center planting units 12. Although the particular location of the unit is not critical, it is important that it operate in soil which has not been previously compacted by either the tractor wheels 294 or planter drive wheels 84. As illustrated in detail in FIGS. 6 and 7, the sensing unit 292 is mounted on the main frame 10 for relative vertical movement in a manner similar to the several furrow-forming units 118, with upper and lower pairs of parallel links 296 and 298, respectively. The forward ends of the links 296 and 298 are pivotally attached to upper and lower pairs of mounting brackets 300 and 302 which, in turn, are clamped to the main frame member 10 with fore-and-aft elongated bolts 304, while the rearward ends thereof are pivotally connected to the opposite sides of an upright transverse channel member 308. A relatively wide shoe or ground feeler 310 having an upwardly curved leading edge is fixed to the lower edge of the channel 308 and is adapted to ride on and follow the surface of the ground. Due to its relatively large surface area and lightweight construction, the shoe 310 will ride at essentially the same level in both hard and soft soils. Disposed adjacent to the left side of the shoe 310 and pivotally connected thereto is a second, relatively narrow shoe or ground feeler 312 which is adpated also to ride on the surface of the ground. The pivotal connection between the two shoes 310 and 312 is effected by a transverse pin 314 extending through the channel 308, and receiving a bearing member 318 fixed to the narrow shoe 312. The extreme rear portion of the shoe 312 supports a weight 320 exerting a constant downward force on the shoe. The combination of this force and the relatively narrow width of the shoe causes the shoe to penetrate the surface of the soil, the depth of penetration being inversely proportional to the relative hardness thereof. In a relatively soft soil, for example, the shoe will penetrate to a considerable depth, while in a relatively hard soil, the penetration will be relatively slight.

Figure 6:
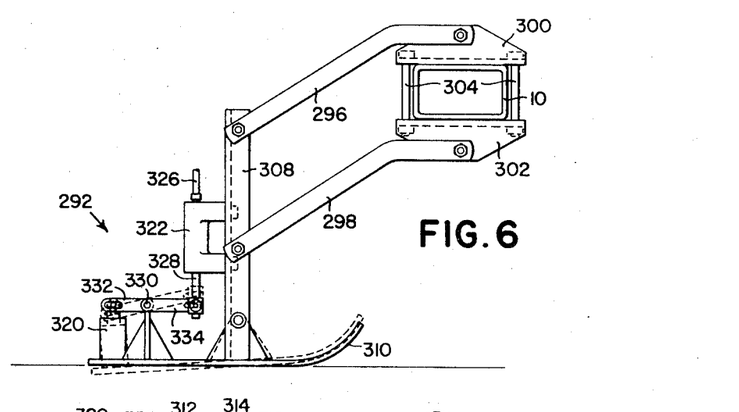
FIG. 6 is a side elevation view of the soil hardness sensing unit of the invention, on a scale reduced from that of FIGS. 3 and 4; and, FIG. 7 is a plan view of the sensing unit of FIG. 6.
Figure 7:
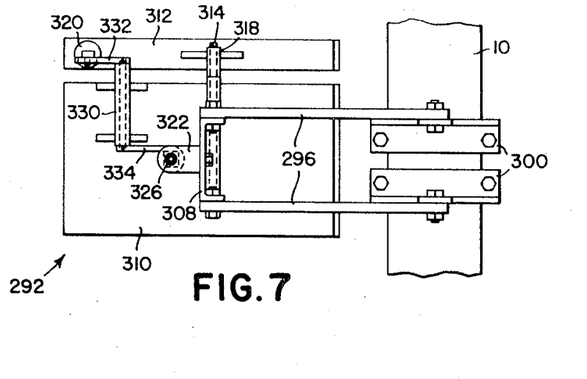

Since as previously noted the wide shoe 310 is adapted to follow the surface of the ground irrespective of its hardness, a comparison of the relative vertical positions of the shoes 310 and 312 will provide a quantitative measure of soil hardness. Means for comparing these vertical positions, and actuating the pressure control valve 288 on the tractor in response to variations therein, is provided in the form of a master-slave hydraulic system comprising a master cylinder 322 on the sensing unit 292 and a slave cylinder 324 on the tractor connected to the cylinder 322 with a single hydraulic line 326. The cylinder 322 is mounted on the channel member 308 of the sensing unit, and includes a vertical push rod 328 coupled with the narrow shoe 312. The coupling comprises a transverse pivot member 330 mounted on the shoe 312, a first arm 332 fixed to the left end of the member 330 and pivotally connected at its rearward end to the weight 320, and a second arm 334 fixed to the right end of the member 330 and pivotally connected at its forward end to the push rod 328 of the cylinder 322. In operation, vertical movement of the narrow shoe 312 relative to the wide shoe 310 is transmitted through the coupling mechanism 330, 332, and 334 to the push rod 328 of the cylinder 322. The resulting displacement of fluid in the cylinder 322 results in corresponding movement of the push rod 336 of the slave cylinder 324, and thus movement of the control lever 290 of the pressure control valve 288. The components of the system are so designed that the resulting change in pressure of the fluid in the lines 284 and 286 and planting unit actuators 248 is of just the required magnitude to maintain a constant furrow depth. For example, as the planter passes from an area of relatively hard soil to an area of relatively soft soil, the narrow shoe 312 of the sensing unit will assume a deeper running level relative to the wide shoe 310. This downward movement of the shoe 312 is transmitted to the push rod 328. As the push rod is moved upwardly into the cylinder 322, fluid is displaced therefrom into the line 326, an equal quantity of fluid is displaced from the other end of the line into the slave cylinder 324, and the push rod thereof is advanced forwardly, thus moving the control lever 290 of the valve 288 in a clockwise direction as viewed in FIG. 5. Such clockwise movement of the lever 290 in turn produces a lower fluid pressure in the fluid actuators 248 and thus a lesser down force acting on the furrow-forming units 118. This reduction in down force is of sufficient magnitude to just offset the tendency of the unit depth gauge wheels to sink into the relatively soft soil, and thereby maintains the unit at the same vertical position relative to the ground surface. In a similar though inverse manner, the pressure in the actuators 248 is increased as the planter moves from a relatively soft area to a relatively hard area, thereby increasing the down force on the units 118 and off-setting the tendency of the unit to ride at a higher level in the harder soil.

We claim:

1. A precision depth seed planter comprising: a main frame; a planting unit mounted on the main frame and including a furrow-forming unit connected to the frame for relative vertical movement, said furrow-forming unit including a ground penetrating furrow-forming means, and depth gauge means for supporting the unit relative to the ground and regulating the approximate operating depth of said furrow-forming means; hydraulic actuator means acting between said main frame and said furrow-forming unit for exerting a downward vertical force on said unit which is independent of the vertical position thereof relative to said frame; a sensing unit mounted on the main frame for relative vertical movement and including ground-engaging means for measuring ground hardness; and hydraulic control means operatively connecting said hydraulic actuator means and said sensing unit for increasing and decreasing the vertical force exerted by said actuator means on said furrow-forming unit in response to the sensing unit engaging harder and softer ground, respectively.

2. The invention defined in claim 1 wherein said planting unit further includes a seed dispensing unit mounted on said main frame above said furrow-forming unit, said seed dispensing unit including a seed container and selecting mechanism; and a seed conveying conduit extending between said seed dispensing unit and said furrow-forming unit for conveying seeds from said seed selecting mechanism to the furrow formed by said furrow-forming means.

3. The invention defined in claim 2 wherein said seed dispensing unit is disposed in substantially fore-and-aft alignment with said furrow-forming unit, said seed selecting mechanism includes a downwardly directed seed discharge opening disposed generally vertically from said furrow-forming means, and said seed conveying conduit extends generally vertically between said seed discharge opening and said furrow-forming means.

4. The invention defined in claim 3 wherein said seed dispensing unit is rigidly connected to the main frame, said furrow-forming unit includes parallel linkage means mounting said unit on the main frame for parallel vertical movement, and said hydraulic actuator means acts between said seed dispensing unit and said parallel linkage means.

5. The invention defined in claim 2 wherein said planting unit further includes a press wheel unit pivotally mounted on and extending rearwardly from said furrow-forming unit, said press wheel unit including press wheel means mounted rearwardly of and in substantially fore-and-aft alignment with said furrow-forming means.

6. The invention defined in claim 2 including a plurality of said planting units mounted in transverse alignment on said main frame, each unit including a seed dispensing unit and associated selecting mechanism; transverse drive shaft means extending between adjacent seed dispensing units; means on each of said dispensing units drivingly connecting said drive shaft means with the seed selecting mechanism contained thereon; ground-engaging drive wheel means mounted on said main frame; and means drivingly connecting said ground-engaging drive wheel means with said drive shaft means for driving said seed selecting mechanisms.

7. The invention defined in claim 1 wherein said depth gauge means comprises a pair of wheels disposed on opposite sides of and in substantially transverse alignment with said furrow-forming means.

8. The invention defined in claim 1 including a plurality of furrow-forming units connected to the frame for relative vertical movement, and a plurality of hydraulic actuators acting between said main frame and said furrow-forming units for exerting a vertical force on the furrow-forming units; and wherein said control means includes means for simultaneously and uniformly regulating the force exerted by said hydraulic actuators.

9. The invention defined in claim 8 wherein said control means includes a source of hydraulic fluid under pressure; means for regulating the pressure of said fluid; and fluid line means connecting said hydraulic actuator means in parallel with each other and with said source of hydraulic fluid.

10. The planter defined in claim 1 wherein said sensing unit comprises a pair of ground-engaging sensors, and means for comparing the relative vertical positions of said sensors.

11. The planter defined in claim 10 wherein one of said sensors is relatively wide and is adapted to ride substantially on the surface of the ground, and the other of said sensors is relatively narrow and is adapted to penetrate the surface of the ground, the vertical distance between said wide and narrow sensors being greater in soft than in hard ground.

12. The planter defined in claim 11 wherein said hydraulic control means is operative to increase and decrease the vertical force exerted by said actuator means on said furrow-forming unit in response to a decrease and increase, respectively, in the vertical distance between said wide and narrow sensors.

13. An agricultural implement comprising: a main frame; at least one ground-working unit mounted on said main frame for relative vertical movement; ground-engaging depth gauge means on said ground-working unit supporting said unit relative to the ground and regulating the approximate operating depth thereof; hydaulic actuator means acting between said main frame and said ground-working unit for exerting a vertical force on said unit which is independent of the vertical position thereof relative to said main frame; a sensing unit mounted on the main frame for relative vertical movement and including ground-engaging means for measuring ground hardness; and hydraulic control means operatively connecting said actuator means and said sensing unit for varying the force exerted by said actuator means in response to variations in ground hardness and thereby regulating the precise operating depth of said ground-working unit.

14. In an agricultural implement having a main frame, at least one ground-engaging unit mounted on the main frame for relative vertical movement, and hydraulic actuator means acting between said main frame and said unit for exerting a vertical force on the latter, means responsive to soil hardness to regulate the force exerted by said actuator means and thereby maintain said ground-engaging unit at a constant vertical position relative to the surface of the ground, said means comprising: a first relatively wide sensor adapted to ride on and substantially level with the surface of the ground; a second, relatively narrow sensor adapted to ride on the ground and penetrate the surface thereof, the depth of penetration of said narrow sensor varying with soil hardness; means operatively connecting said wide and narrow sensors for comparing the levels of said sensors and thereby measuring the depth of penetration of said narrow sensor; and hydraulic fluid supply means for supplying fluid under pressure to said hydraulic actuator means, said supply means including means responsive to and operative to vary the fluid pressure in relation to the depth of penetration of said narrow sensor, whereby said ground-engaging unit is maintained at a constant vertical position relative to the surface of the ground irrespective of variatons in soil hardness.

15. A precision depth seed planter comprising: a main frame; a furrow-forming and closing structure including a furrow-forming blade and associated gauge wheels regulating the operating depth of the blade, said structure being pivoted for vertical movement on the main frame; a plurality of tanks adapted to carry variable amounts of material and feed material to said furrow opening and closing structure; means supporting all of said tanks on the main frame independently of said furrow-forming and closing structure; hydraulic actuator means acting between said main frame and said structure exerting a downward force thereon; ground feeler means supported on the frame engageable with the ground for measuring the hardness thereof; and control means operatively connected to said ground feeler means and said hydraulic actuator means for increasing and decreasing the downward pressure by said actuator means on said structure in response to the ground feeler means engaging harder and softer ground respectively.

16. The precision depth seed planter as set forth in claim 15 in which said frame includes a rearward projecting portion overlying the furrow opening and closing structure, said structure is supported for vertical movement on the frame by a fore-and-aft extending lever pivoted at its forward end on the frame and at its rearward end to the structure; and said actuator means extends between the frame and lever.

17. The precision depth seed planter as set forth in claim 16 in which the furrow-forming blade and gauge wheels are closely adjacent the pivotal connection between the structure and the rearward end of the lever.

* * * * *